（12） United States Patent
Tatourian

(10) Patent No.: US 10,453,275 B2
(45) Date of Patent: Oct. 22, 2019

(54) SENSOR MANAGEMENT IN AUTONOMOUS VEHICLES

(71) Applicant: Intel Corporation, Santa Clara, CA (US)

(72) Inventor: Igor Tatourian, Fountain Hills, AZ (US)

(73) Assignee: Intel Corporation, Santa Clara, CA (US)

( * ) Notice: Subject to any disclaimer, the term of this patent is extended or adjusted under 35 U.S.C. 154(b) by 7 days.

(21) Appl. No.: 15/817,841

(22) Filed: Nov. 20, 2017

(65) Prior Publication Data

US 2019/0051063 A1 Feb. 14, 2019

(51) Int. Cl.
*G07C 5/02* (2006.01)
*G05D 1/00* (2006.01)
*G07C 5/08* (2006.01)
*G05D 1/02* (2006.01)
*G07C 5/00* (2006.01)

(52) U.S. Cl.
CPC ............. *G07C 5/02* (2013.01); *G05D 1/0022* (2013.01); *G05D 1/021* (2013.01); *G07C 5/0808* (2013.01); *G07C 5/006* (2013.01); *G07C 5/008* (2013.01); *G07C 5/0816* (2013.01)

(58) Field of Classification Search
CPC ...... G07C 5/02; G07C 5/0808; G05D 1/0022; G05D 1/021
USPC ........................................................ 701/29.8
See application file for complete search history.

(56) References Cited

U.S. PATENT DOCUMENTS 7,411,494 B2 * 8/2008 Kates ....................... G08B 1/08
340/539.22
9,939,813 B2 * 4/2018 Shashua ................. G01C 21/32
10,162,355 B2 * 12/2018 Hayon ................... G01C 21/32

* cited by examiner

*Primary Examiner* — Gertrude Arthur Jeanglaude
(74) *Attorney, Agent, or Firm* — Schwabe, Williamson & Wyatt, P.C.

(57) ABSTRACT

An apparatus for sensor management in computer-assisted or autonomous driving (CA/AD) vehicles, comprising a sensor analyzer and a sensor manager. The sensor analyzer is to determine a difference between a baseline sensor reading of a landmark, and a subsequent reading of the same landmark at a later point in time. The sensor manager is to determine whether a management action is needed on the basis of the determined difference, in further consideration of differential experiences from other CA/AD vehicles.

25 Claims, 6 Drawing Sheets

SENSOR MANAGEMENT IN AUTONOMOUS VEHICLES

TECHNICAL FIELD

Embodiments described herein generally relate to vehicle sensors, computer-assisted or autonomous driving. In particular, apparatuses and systems for detecting changes in sensor performance on computer-assisted or autonomous vehicles are described.

BACKGROUND

Modern computer assisted or autonomous driving (CA/AD) vehicles require a variety of sensors to feed data into the vehicle computer to enable the vehicle to safely operate. Likewise, the sensors must provide the computer with reliably accurate data. Various factors can prevent a sensor from providing reliable and accurate data, such as weather conditions, dirt and debris on the sensor, and/or normal sensor degradation that is inherent with some sensor types. Each of these obstacles to a sensor providing accurate information requires a different management approach.

DESCRIPTION OF EMBODIMENTS

Figure 1:
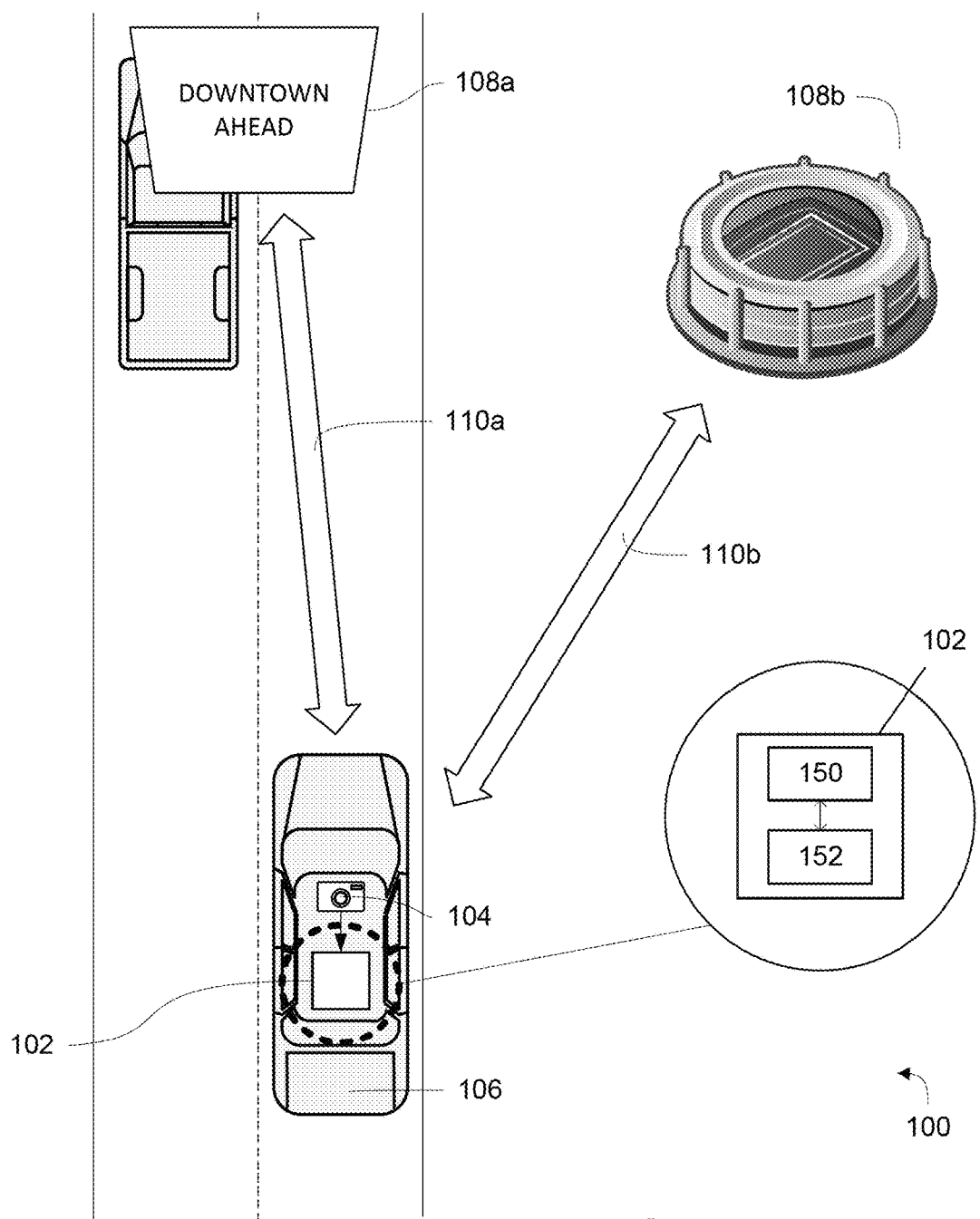
FIG. 1 is a diagram of the components of a system for sensor management in a CA/AD vehicle, according to an example embodiment.

Embodiments of the present disclosure are directed toward methods and apparatuses for monitoring sensor conditions in a computer assisted or autonomous driving (CA/AD) vehicle (or simply, "vehicle"). Such vehicles may also include semi-autonomous driving vehicles. As used herein, the term semi-autonomous driving is synonymous with computer-assisted driving. The term does not mean exactly 50% of the driving functions are automated. The percentage of driving functions automated may be a fraction of a percent to almost 100%. The disclosed systems and methods enable a vehicle to consistently monitor the status of one or more sensors that the vehicle may use to enable computer assisted or autonomous driving. By comparing a baseline reading from a given sensor of a reference point, such as a landmark, with subsequent readings from the same sensor of the same reference point, changes/degradation in the sensor quality may be ascertained. These detected changes may be the result of a variety of factors: Inherent degradation over time may be a normal occurrence for some sensor types. Weather conditions may transiently affect the quality of sensor readings, where improving conditions will result in improving sensor readings. Similarly, the presence of debris or dirt on the vehicle, particularly on a sensing portion of the sensor, can result in an artificial degradation of sensor readings that cleaning will correct.

By cross-referencing sensor readings from other sensors both on the same vehicle as well as other vehicles that use identical or similar sensors, temporary degradation due to external factors may be distinguished from degradation due to a failing or aging sensor. In some implementations, combining sensor readings from other vehicles as well as potentially different sensors on the same vehicle may allow further distinguishing degradation due to factors such as weather from debris or dirt on the sensor. Determining the cause of a degraded sensor reading enables the systems of a CA/AD vehicle to notify a user of appropriate corrective action, whether it is cleaning the sensor, bringing the vehicle in for the sensor servicing or replacement, or temporarily modifying vehicle behavior until weather conditions improve. In some cases, it simply may not be safe for the vehicle to continue operation until appropriate corrective action is taken. Other advantages may be realized, as discussed below in greater detail.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 depicts an example system 100 that embodies a sensor management apparatus 102 for managing one or more sensors 104 in a computer-assisted or autonomous driving (CA/AD) vehicle 106. As vehicle 106 travels, it may come within a range 110a of landmark 108a, a second range 110b of a second landmark 108b, or both. System 100 may select landmark 108a, landmark 108b, and/or any other suitable landmark (not shown). Using sensor 104, system 100 records a baseline reading at a first point in time of the selected landmark upon detection. Upon vehicle 106 traveling a second time within range 110a of first landmark 108a and/or second range 110b of second landmark 108b, system 100 may use sensor 104 to record a subsequent reading at a second subsequent point of time of the selected landmark upon detection.

Ranges 110a and 110b may represent the maximum range, expressed as a distance, within which respective landmarks 108a and 108b may be detected by a given sensor 104. It will be appreciated that ranges 110a and 110b may depend upon the nature of each respective landmark 108a and 108b, as well as the nature of sensor 104. For example, where sensor 104 is a video camera and landmarks 108a and 108b are visual reference points such as a highway sign or building, ranges 110a and 110b may be expressed in terms of thousands of feet, fractions of a mile, or even miles, where a particular landmark is large and readily capable of detection at a great distance. Conversely, where sensor 104 is a short-range sensor such as an ultrasonic-based range finder, ranges 110a and 110b may be expressed in tens of feet, or possibly even inches, as sensor 104, as an ultrasonic-based range finder, may not capable of accurately detecting objects more than a few feet away.

Readings from sensor 104 may be fed into a sensor management apparatus 102, which in turn may interface with vehicle 106's on-board systems for providing computer assistance in driving, such as emergency braking, lane keeping assistance, obstacle avoidance, etc., in some embodiments, or fully autonomous driving and navigation, in other embodiments. Sensor management apparatus 102 may be comprised of a sensor analyzer 150, which may be coupled to a sensor manager 152. Sensor analyzer 150 may receive as input the readings from sensor 104, and determine a difference, if any, between the baseline reading of the selected landmark and the subsequent reading.

Sensor analyzer 150 may provide this determined difference to sensor manager 152. Sensor manager 152 may determine whether a management action is needed for sensor 104 based at least in part on the determined difference. In some embodiments, this determination may further be based in part by a time period length defined by the first and second points in time for the measurement of the baseline and subsequent readings. In determining whether a management action is needed, sensor analyzer 150 may further consider other differential experiences reported by other CA/AD vehicles, which may be obtained from a remote server. This will be discussed in greater detail herein with reference to FIG. 4.

A management action may include maintenance, repair or replacement, or a simple cleaning of sensor 104. Some actions, such as a recalibration of sensor 104, may be able to be accomplished automatically or partially automatically by sensor management apparatus 102. Other actions, such as some maintenance, repairs, or replacements, may require a user to take vehicle 106 into a service station. Still other actions, such as cleaning dirt and/or debris from a sensor 104, may require user interaction to accomplish the cleaning. In cases where user interaction is needed, sensor management apparatus 102 may notify the user of which sensor or sensors are degraded and provide the required actions to take. In some embodiments, sensor management apparatus 102 may visually demonstrate to the user the actions to take.

For example, if sensor manager 152 determines that sensor 104 is permanently degraded below a predetermined threshold, it may instruct a user to take vehicle 106 to a service station or, if sensor 104 has user-serviceable components, may provide guidance (visual or otherwise) to the user to effect repair. Conversely, if sensor manager 152 determines that sensor 104 is transiently degraded, e.g. may be covered with dirt or debris, it may instruct a user to have vehicle 106 washed, or it may instruct the user to clean sensor 104. In some embodiments, these instructions may also include information about where to find the affected sensor 104 and any special cleaning or repair techniques (e.g. tools or supplies) that may be needed.

In embodiments, sensor manager 152 may be in communication with a display unit to provide the user with notifications and/or directions for sensors 104 that are degraded and in need of servicing. The display unit may be configured to provide any additional guidance needed to assist a user in servicing sensor 104. The display unit may be part of an infotainment system in vehicle 106, or a smartphone or tablet, which may be running software specific to vehicle 106, or any other device with similar notification capabilities.

While FIG. 1 depicts sensor analyzer 150 and sensor manager 152 as being parts of a single sensor management apparatus 102, this may be a logical association, and not necessarily indicative of a particular physical embodiment. Embodiments may include sensor analyzer 150 and sensor manager 152 as part of a single physical apparatus, or as discrete components. Sensor analyzer 150 and sensor manager 152 may be implemented in software. For example, each of sensor analyzer 150 and sensor manager 152 may be embodied as software modules, to be executed by one or more computer devices 500. Each may be discrete software modules, or their functionality may be combined in to a single module. In other embodiments, sensor analyzer 150 and sensor manager 152 may be implemented in hardware. In such embodiments, each may further be implemented as separate hardware components or modules, or the functionality of sensor analyzer 150 and sensor manager 152 may be combined into a single hardware device. Such hardware devices may include application-specific integrated circuits (ASICs), field-programmable gate arrays (FPGAs), discrete components, programmable controllers, general purpose programmable CPUs, or any other hardware technology now known or later developed that is capable of providing the necessary logic. Still other embodiments may employ a combination of hardware and software to achieve the functionality of sensor analyzer 150 and sensor manager 152, with portions of either variously being implemented in hardware or software.

Sensor management apparatus 102 may select landmarks 108 using a variety of strategies. In some embodiments, sensor management apparatus 102 may monitor the location of vehicle 106 (via GPS or other location information) and, when it is determined that vehicle 106 passes by a particular location on a routine basis, select one or more landmarks 108 proximate to that location detected by a sensor 104 for an initial baseline and subsequent readings. Determining whether a location is passed on a routine basis may be accomplished using any suitable technique, such as triggering landmark selection when vehicle 106 passes by a location a predetermined number of times. Other embodiments may rely upon user input to trigger landmark selection. A user may designate a particular location as "home", "office", "store", or other routinely visited location, which sensor management apparatus may then rely upon to begin landmark selection. Somewhat of a hybrid of this approach, some embodiments may recognize, e.g. after a predetermined number of times, a particular route between two points (such as home and work) as being repeated and automatically engage landmark selection somewhere during the route. Still other embodiments may integrate information from the remote server to assist in selection, where information and possibly readings from landmarks selected by other vehicles may be provided to vehicle 106 when vehicle 106 provides the remote server with its location. It should be understood that the foregoing are only a few example possible ways in which sensor management apparatus 102 may select a landmark; any suitable method now known or later developed may be employed.

FIG. 1 depicts landmarks 108a and 108b that are suitable for use where sensor 104 is a camera. Landmarks 108a and 108b may be any point of reference that is detectable by sensor 104 and relatively invariant in nature over time, to allow a comparison between initial and subsequent readings that is meaningful with respect to sensor 104 performance. In the example of FIG. 1, sensor 104 may be a camera, with landmarks 108a and 108b being various physical structures. Landmark 108a, for example, is depicted as an overhead road sign, typical of the sort that may be routinely passed on a highway. Landmark 108b is depicted as a stadium or sports arena, which is a typically large structure that is easy to detect from a distance. In either case, the landmark may be a point of reference that can be uniquely identified from the surrounding environment. A street sign may be uniquely identified from other signs by its content where object recognition is performed on the output from sensor 104, and a sports arena may be a large and uniquely shaped structure that defines a skyline, and so can be recognized at a distance from other buildings and structures.

It should be appreciated the suitability of a particular landmark 108 may depend upon the nature of sensor 104. For example, where sensor 104 is an ultrasonic detector, such as may be employed for parking assistance/automatic parking, a freeway sign such as landmark 108a or a sports area such as landmark 108b may be unsuitable. An ultrasonic sensor 104 would likely never be within sufficient range to detect of either of such landmarks, let alone to distinguish such landmarks from the surrounding environment. Sensor management apparatus 102 thus may be configured to select landmarks 108 on the basis of actual detection by a given sensor 104. In the example of an ultrasonic sensor 104, appropriate landmarks may be close-range obstacles such as curbs, walls, other vehicles, etc., sensed when vehicle 106 is either stationary or moving at relatively slow speeds, such as those experienced when the vehicle is being parked. Other landmarks 108 may be shared by multiple sensors 104, but may be detected differently. A highway sign may be an equally useable landmark for both a camera and radar or LIDAR implementation of sensor 104.

Where sensor 104 is a camera, the highway sign may be detected using object recognition, while the highway sign may simply be registered as a distance from a planar surface where sensor 104 is a radar or LIDAR sensor. As discussed herein, location information provided by GPS or another suitable location information source may be used to uniquely verify a particular landmark where sensor 104 provides only range and/or crude shape information.

Where sensors 104 provide relatively basic information, sensor management apparatus 102 may need to integrate information from other sensors to accomplish management. For example, a long range radar sensor may simply provide a distance range from the sensor to whatever object is most immediately in front of the radar. Obtaining an initial baseline reading and subsequent reading may require the addition of relatively accurate location information so that sensor management apparatus 102 may determine that sensor 104 is detecting the same landmark 108 each time. Such information may be obtained from a navigational sensor, such as a GPS receiver, IMU, or other sensor capable of determining the location of vehicle 106, and by implication, sensor 104 on a sufficiently accurate basis. Alternatively or in addition, a sensor 104 that is a camera may be cross referenced by sensor management apparatus 102 with readings from a radar or LIDAR sensor 104 (or other sensor 104 that provides little more than basic range information) to confirm a particular landmark.

The level of accuracy needed may depend on the sensor type. Where sensor 104 is an ultrasonic sensor used for parking, its effective range may be limited to within ten feet or so of the vehicle. Identifying a landmark 108 suitable for use with such a sensor may require location information that is accurate to within a couple of feet so that sensor management apparatus 102 can select suitably close landmarks in a repeatable fashion, e.g. when vehicle 106 is in a garage or near a location frequented by the user. Such relatively high accuracy location information can be obtained using any method now known or later developed, such as differential GPS, Wide-Area Augmentation, a radio beacon or tag with a predetermined location, or similar technology. Conversely, where sensor 104 is a camera, only rough location accuracy (as may be supplied by unenhanced GPS) may be needed or, in some circumstances, no location information may be needed. For example, where a selected landmark 108 is unique to a single location, e.g. a road sign with unusual or distinctive words that can be recognized and are unlikely to exist elsewhere, the uniqueness of the landmark may obviate any need for external or supplemental location information.

Figure 2:
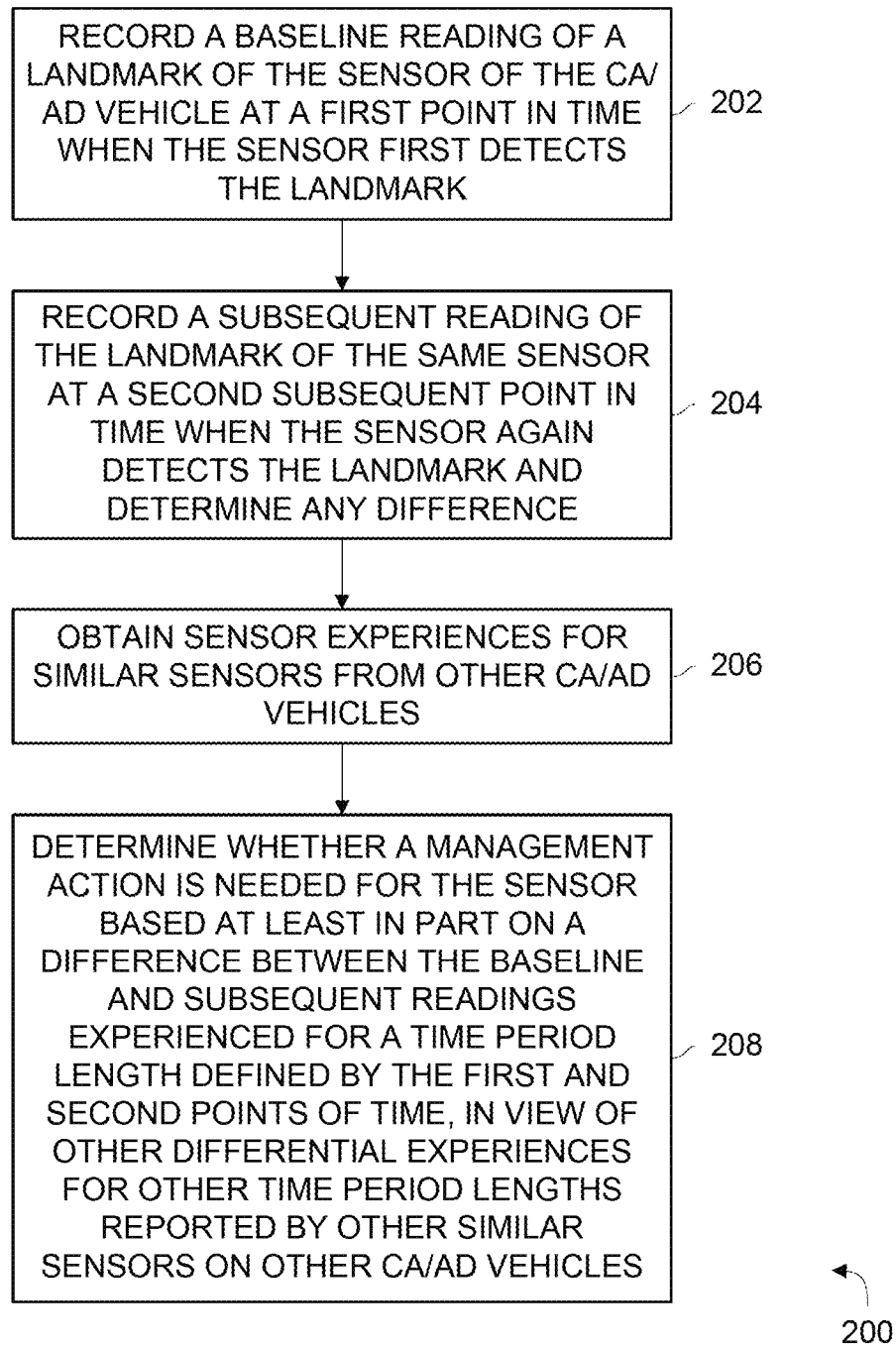
FIG. 2 is a flow chart of one method of sensor management in a CA/AD vehicle, according to an example embodiment.

FIG. 2 depicts an example method 200 that sensor management apparatus 102 may implement to manage one or more sensors 104. For the embodiments shown, method 200 may include operations performed at blocks 202-208. In alternate embodiments, method 200 may include more or less operations, and some of the operations may be performed in different order.

Starting in block 202, a baseline reading of a landmark of sensor 104 of CA/AD vehicle 106 may be recorded at a first point in time when sensor 104 first detects the landmark. The baseline reading may include information specific to the type of sensor 104, and may potentially integrate information from other sensors, such as location information as discussed above. For example, where sensor 104 is a long range radar, the recorded baseline information may include a distance or range 110 to an object upon initial detection, as well as the location of vehicle 106 at the time of detection. Conversely, where sensor 104 is a camera, the recorded baseline information may include the relative size of a detected object within the camera's field of view upon sufficient resolution for detection to be performed. Alternatively or additionally, range 110 information to a detected object (such as from a long range radar or LIDAR) may be included, along with vehicle 106 location. Likewise, camera sensor information may be included with a baseline reading for a sensor 104 that is a LIDAR, radar, ultrasonic, or other similar ranging technology to help confirm landmark selection.

Sensor management apparatus 102 may select a landmark 108 and take a baseline reading at a point in time where environmental conditions present degraded sensor performance. While sensor management apparatus 102 may be able to detect such conditions as will be discussed further below, in some scenarios such degradation may not be detected until a subsequent reading is performed. If sensor management apparatus 102 determines that a baseline reading is diminished from normal sensor performance due to environmental conditions, sensor management apparatus 102 may discard the initial baseline reading and promote the subsequent reading to the status of baseline reading, to be used as a reference against further subsequent readings. Alternatively, sensor management apparatus 102 may simply mark the baseline as indicative of a degraded performance, and continue to use it as a baseline, where subsequent normal readings will be expected to have a positive difference against the baseline, and degraded performance will be equal to or less than the baseline.

In block 204 a subsequent reading of the same landmark may be recorded from the same sensor 104 at a second subsequent point in time when sensor 104 detects the landmark a second time. As with the baseline reading, information from multiple sensors 104 may be combined to ensure accurate landmark detection. This cross-checking of sensor 104 information may also confirm that a detected landmark matches a previous baseline reading, and reduce the likelihood of misidentifying a landmark that may have not been previously baselined. Following recording of the subsequent reading, the subsequent reading is compared with the baseline reading and a difference, if any, may be computed. For example, sensor 104 may have a recorded baseline reading with a range 110a of 1000 meters for initial detection of landmark 108a. A subsequent reading of landmark 108a has a range 110a of 800 meters for initial detection. Sensor analyzer 150 may determine the difference of minus 200 meters between readings, indicating that sensor 104 is experiencing a degraded range.

The baseline and subsequent readings may be recorded by any suitable means in any suitable fashion. Some embodiments may use a device driver specific to sensor 104's type that interfaces with sensor 104. Such a device driver may be implemented as a software module, or in dedicated hardware, and may be a part of sensor management apparatus 102 (including either sensor analyzer 150 or sensor manager 152), a discrete component, or integrated with another module. In embodiments, the readings may be stored into a storage device. The storage device may be integrated as part of sensor 104 or sensor management apparatus 102, may be a separate component, such as a storage device associated with a computer device 500, or may be a discrete stand-alone component. Other embodiments may have sensor 104 itself handle both reading and storage. In such implementations, stored readings may be retrieved from sensor 104 at a later time from the time of reading. Depending on the configuration of sensor 104, sensor 104 may provide output in a common or standard format that requires a driver, or no driver at all.

Sensor experiences for similar sensors may then be obtained from other CA/AD vehicles in block 206. Sensor manager 152 may communicate with a remote server, discussed with reference to FIG. 4, to obtain differential experience information. The differential experience information may be from other CA/AD vehicles that are located proximate to vehicle 106, and may have the same or a similar type of sensor 104 that is being managed. In some embodiments, such differential experience information may include location information and/or environmental conditions as determined by each CA/AD vehicle that uploads its differential experience information to the remote server, as well as the elapsed time period between each CA/AD vehicle's baseline reading and subsequent reading.

Finally, in block 208, sensor management apparatus 102 may determine whether a management action is needed for sensor 104. This determination may be based at least in part on a difference between the baseline and subsequent readings experienced for a time period length defined by the first and second points of time, in view of other differential experiences for other time period lengths reported by other similar sensors on other CA/AD vehicles. Some possible management actions were discussed above with reference to FIG. 1. In addition to service and/or maintenance of a sensor 104, sensor management apparatus 102 may instruct the CA/AD systems on vehicle 106 on the status of sensor 104, including the degree and type of degradation. This may enable vehicle 106 to potentially adjust its driving strategy (or discontinue driving) to account for any reduction in sensor 104 effectiveness while still ensuring an appropriate level of safety. The length of time experienced by readings can inform sensor management apparatus 102 of an expected degradation amount, which may be based upon known characteristics of the type of sensor 104 being managed.

A wide variety of factors may influence whether a particular sensor reading varies from an earlier and/or baseline reading. The presence of environmental conditions such as fog, snow, rain, dust, smoke, traffic, or heat, to name a few possible factors, may cause a reduction in the effective range of sensor 104. Environmental conditions may further have different impacts on different sensors. For example, while a dense fog may greatly obscure a camera and reduce the effectiveness of object detection, such fog may not significantly affect the performance of a long range radar, which may use a specific radio frequency that can penetrate fog sufficiently to allow normal performance. Conversely, while heavy traffic may preclude a long range radar or LIDAR from obtaining a meaningful reading on detection range (as all vehicles are well within the detection envelope), a camera nevertheless may be able to detect visual landmarks.

Environmental conditions may include any factors external to vehicle 106 that can affect performance of sensor 104. Such conditions may include weather, such as rain, fog, snow, sleet, etc.; man-made conditions, such as smoke or smog, or traffic; conditions local to vehicle 106, such as dirt, mud, or debris; or any other phenomena that may hamper or otherwise alter the performance of sensor 104.

Integration of sensor information from multiple different sensors 104 may allow sensor management apparatus 102 to distinguish between a difference in readings caused by sensor degradation and a difference caused by environmental factors. For example, if a subsequent reading from a camera indicates increasing difficulty in object detection and a corresponding LIDAR measurement also indicates a decrease in effective range detection, apparatus 102 may determine that environmental factors such as fog, dust, or smoke are the cause of the decreased performance.

Obtaining differential experience information may enable sensor management apparatus 102 to better distinguish between possible causes of sensor 104 degradation. In one scenario, a degradation is determined by sensor analyzer 150, but relevant differential experience information obtained by sensor manager 152 indicates that environmental conditions do not account for the degradation. Self-test information from sensor 104 indicates that sensor 104 is otherwise in proper working order. Sensor manager 152 may thus conclude that sensor 104 is likely blocked by dirt or debris, and so sensor management apparatus 102 instructs the user to clean sensor 104. In a second scenario, relevant differential experience information indicates that other vehicles are experiencing a similar degradation, leading sensor manager 152 to conclude that external environmental factors are the cause of the degradation. Sensor management apparatus 102 may not instruct the user that service is needed, but may notify the CA/AD systems of vehicle 106 that a reduction in speed and/or more cautious driving strategy should be implemented.

In still another scenario, no differential information may be available, but detected degradation on sensor 104 may be cross-referenced with other sensors on vehicle 106, as discussed above. Where the other sensors are not experiencing degradation, sensor manager 152 may conclude that degraded sensor 104 is in need of servicing or cleaning, and sensor management apparatus 102 may instruct the user accordingly. Conversely, where other sensors on vehicle 106 also are suffering degradation, sensor manager 152 may determine that external environmental factors are causing the degradation.

Sensor management apparatus 102 may further take a proactive approach to managing sensor 104. A service shop proximate to vehicle 106 may be notified automatically when sensor management apparatus 102 determines that sensor 104 is in need of servicing or replacement, and a user of vehicle 106 can be given the option to schedule a time to bring vehicle 106 in for servicing, or to contact a service shop of user's choice.

Figure 3:
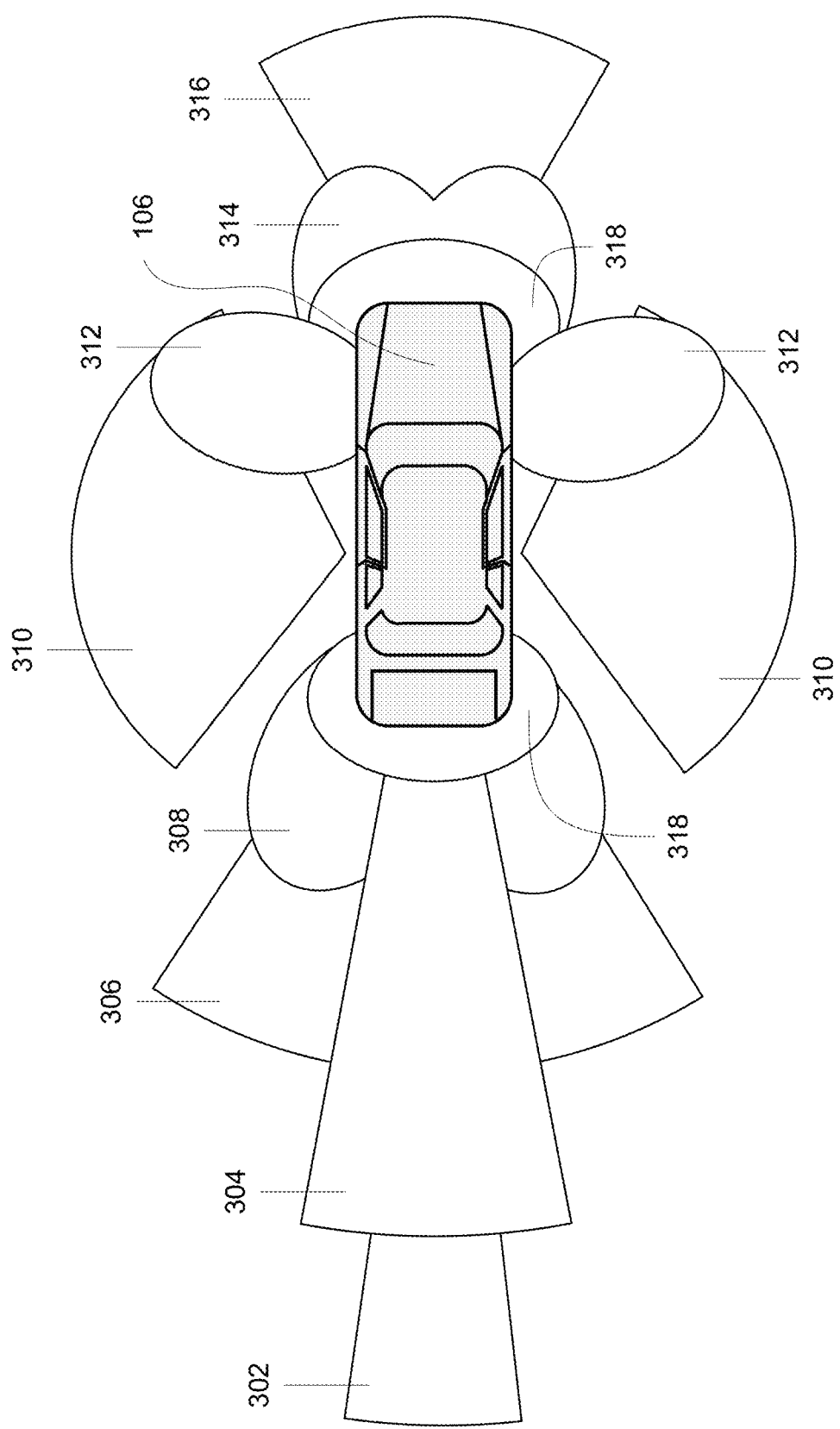
FIG. 3 depicts various possible sensors on an example CA/AD vehicle that can implement an example embodiment.

FIG. 3 depicts various types of sensors 104 with which vehicle 106 may be equipped. Such types may include cameras capable of detecting various wavelengths including visual, infrared and/or ultraviolet light; long range, medium range, and short range radar sensors; laser interferometry distance and range (LIDAR) sensors; and ultrasonic sensors. This list is in no way intended to be exhaustive. Vehicle 106 may be equipped with other types of sensors suitable to the mission of vehicle 106. Further, as suggested by FIG. 3, vehicle 106 may be equipped with multiple types of sensors to enable vehicle 106 to detect and respond to a variety of different driving scenarios. A single sensor management apparatus 102 may receive inputs from all types of sensors 104 on a vehicle 106, and provide monitoring and management for each. Alternatively, multiple sensor management apparatuses 102 may be employed, one for each type of sensor 104 or one for several related types of sensors 104.

By way of example only, a vehicle 106 may utilize long range radar sensors 302 for adaptive cruise control at highway speeds, ultrasonic sensors 318 for close detection of objects while parking or at slow speeds, LIDAR sensors 304 and 312 to detect obstacles within the travel path of vehicle 106 such as other stopped vehicles, pedestrians, walls, etc., short/medium range radar 308 and 314 for rear collision and cross traffic detection, and one or more cameras 306, 310, and 316 for road sign detection, object recognition, and/or other visual recognition. Some sensor types may be interchangeable in duties. Short/medium range radar and LIDAR sensors may be equally capable of detection in similar scenarios, such as detection of close-range objects, or LIDAR and long range radar may each be useable in adaptive cruise control. Depending on object recognition and configuration, cameras could also be used for object detection. In some embodiments, multiple sensor types may be employed in tandem to enhance performance, e.g. LIDAR sensing may be combined with a camera and object recognition to detect a pedestrian who may be about to cross into the path of vehicle 106.

Figure 4:
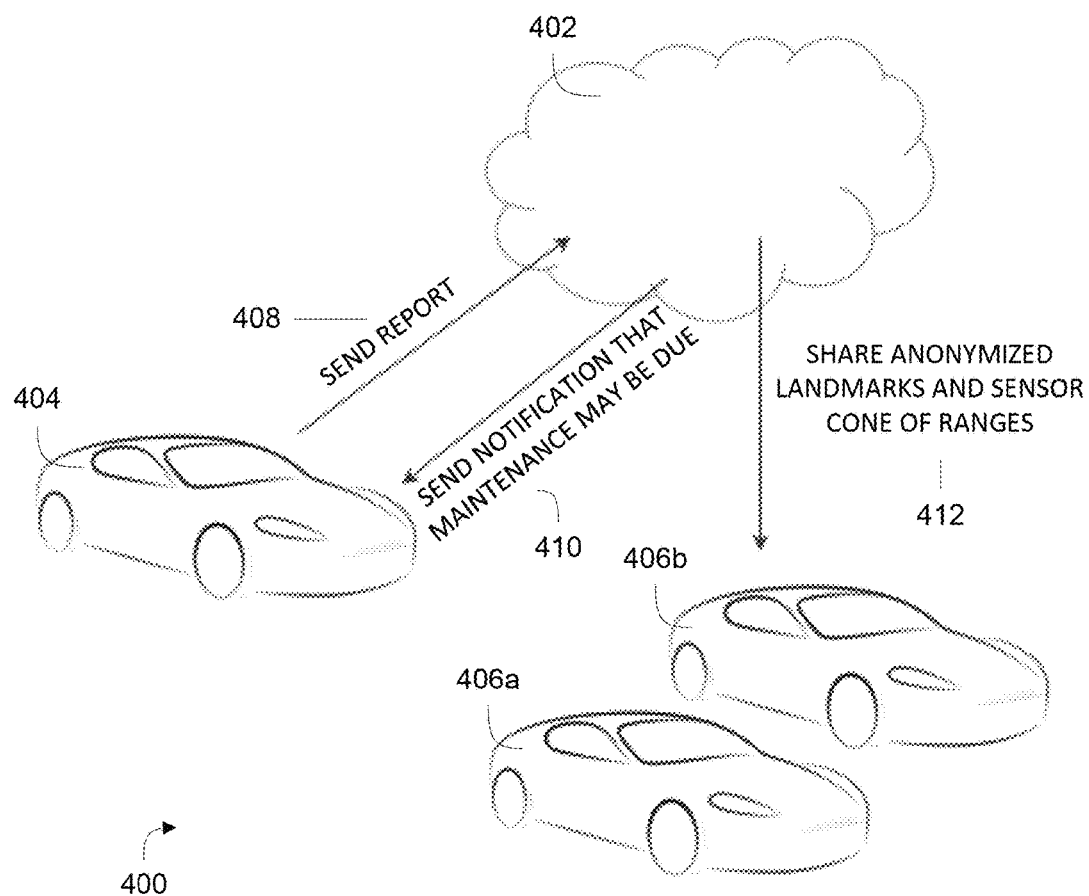
FIG. 4 is a diagram of the interaction between several CA/AD vehicles and a remote database system according to an example embodiment.

FIG. 4 depicts an example system for obtaining differential experience data from other CA/AD vehicles. A remote server 402, here depicted as implemented using a cloud computing platform, may be accessible by CA/AD vehicle 404, which allows obtaining differential experience data from other CA/AD vehicles, such as vehicles 406a and 406b. In some embodiments, CA/AD vehicle 404 may send a report 408 to remote server 402, and may further receive differential experience data from remote server 402, in a similar format and with similar content as report 408. Sensor management apparatus 102 may obtain data from remote server 402 via wireless means, such as over a cellular or satellite-based data network, which allows for sensor manager 152 to make management decisions on the fly, while vehicle 404 is in operation. Further, where sensor 104 requires service, a service shop may be able to access remote server 402 to obtain the various readings from sensor 104, and ascertain a possible mode of failure and/or a particular course of action to bring sensor 104 into proper working order.

Report 408 may include information from sensor analyzer 150 such as the difference between the baseline reading and subsequent reading of landmark 108a or 108b. Other information that may be provided includes location information, the type of sensor 104, additional information from other types of sensors 104 that may be used to cross-check readings, time, date, any measured environmental conditions, and/or any other relevant information available to sensor management apparatus 102. In other embodiments, report 408 may further comprise a management action determination from sensor manager 152, either in addition to or instead of the difference determined by sensor analyzer 150 and any other provided data. The data of report 408 may be anonymized 412 from CA/AD vehicle 404 and/or vehicles 406a and 406b. Further, vehicle 404 may receive notifications 410 from remote server 402 that sensor maintenance may be due. These determinations may be made by remote server 402 on the basis of report 408. In other embodiments, these determinations may further be based upon other reports 408 uploaded by other CA/AD vehicles 406a and 406b, for example.

Relevance of report 408 to sensor management apparatus 102 may be determined using information such as location and time, as well as sensor type. Where a particular report 408 is obtained from a vehicle 406a that is more physically proximate to vehicle 404 and/or is generated more recently than a report obtained from vehicle 406b, sensor management apparatus 102 may favor the report from vehicle 406a. The report from vehicle 406b may be accorded a diminished weight by sensor manager 152 in making management decisions, or may be disregarded. However, reports 408 that are from vehicles that are not proximate may nevertheless be useful to sensor management apparatus 102 to determine a general expected performance level of a given type of sensor 104.

Although FIG. 4 depicts remote server 402 as a cloud computing platform, remote server 402 can be implemented in any fashion that allows exchange of data between vehicle 404 and vehicles 406a and 406b. Some embodiments may omit remote server 402 in favor of direct communication with vehicles 406a and 406b. Such direct communication may be via a wireless network, such as a cell phone network or other area-wide wireless network. Still further, vehicles 406a and 406b may exchange data via direct point to point transfer when sufficiently proximate to vehicle 404. Other embodiments may not only include remote server 402, but remote server 402 may be configured to handle some or all of the functionality of sensor management apparatus 102, including some or all of the functionality of either sensor analyzer 150, sensor manager 152, or both.

Figure 5:
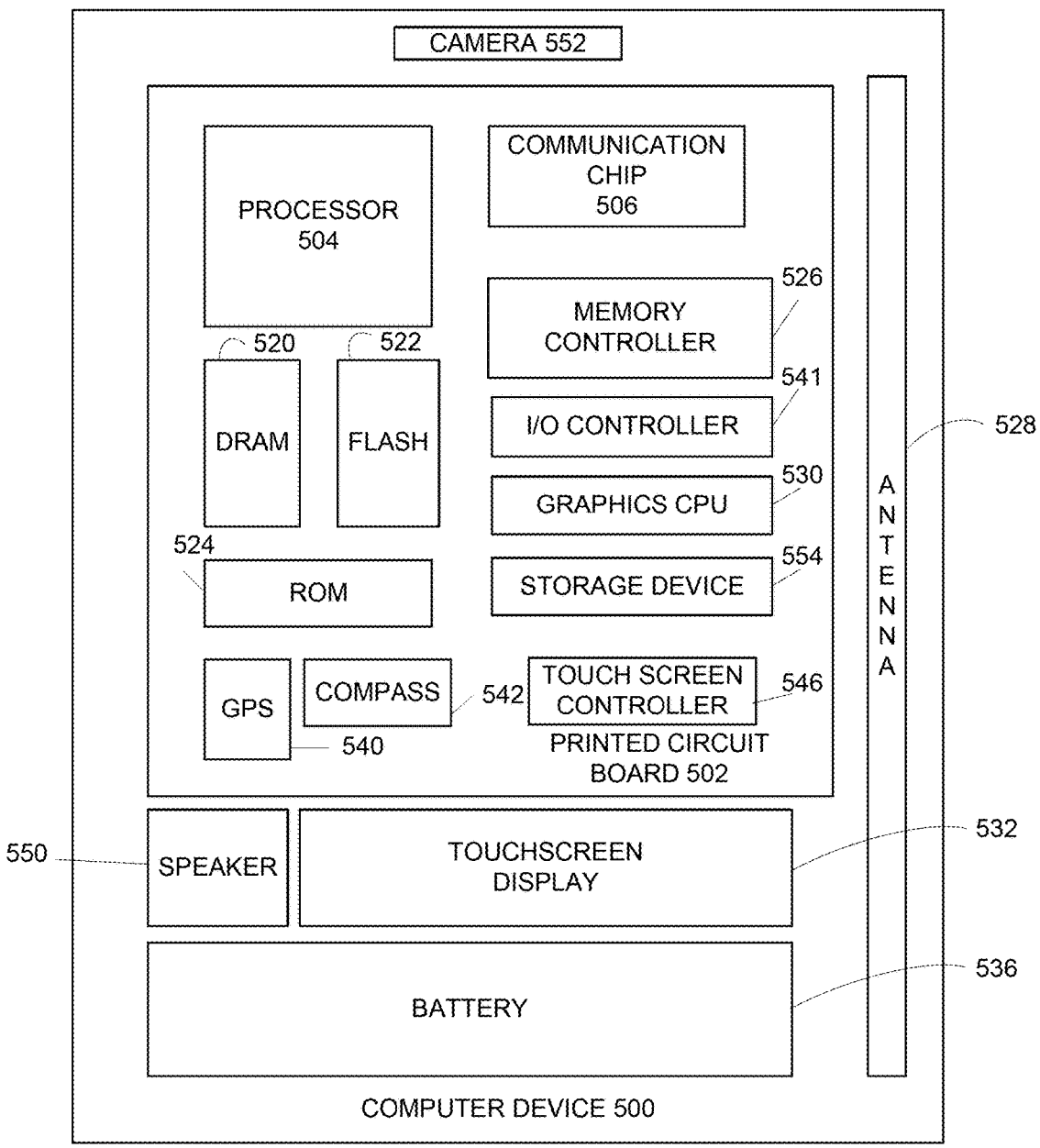
FIG. 5 is a block diagram of an example computer that can be used to implement some or all of the components of the system of FIG. 1.

FIG. 5 illustrates an example computer device 500 that may employ the apparatuses and/or methods described herein (e.g., the sensor management apparatus 102, including sensor analyzer 150 and sensor manager 152), in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display (not shown but could include at least the display area 301 of electronic sign 106), a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the sensor management methods described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, or a server. In further implementations, the computer device 500 may be any other electronic device that processes data.

Figure 6:
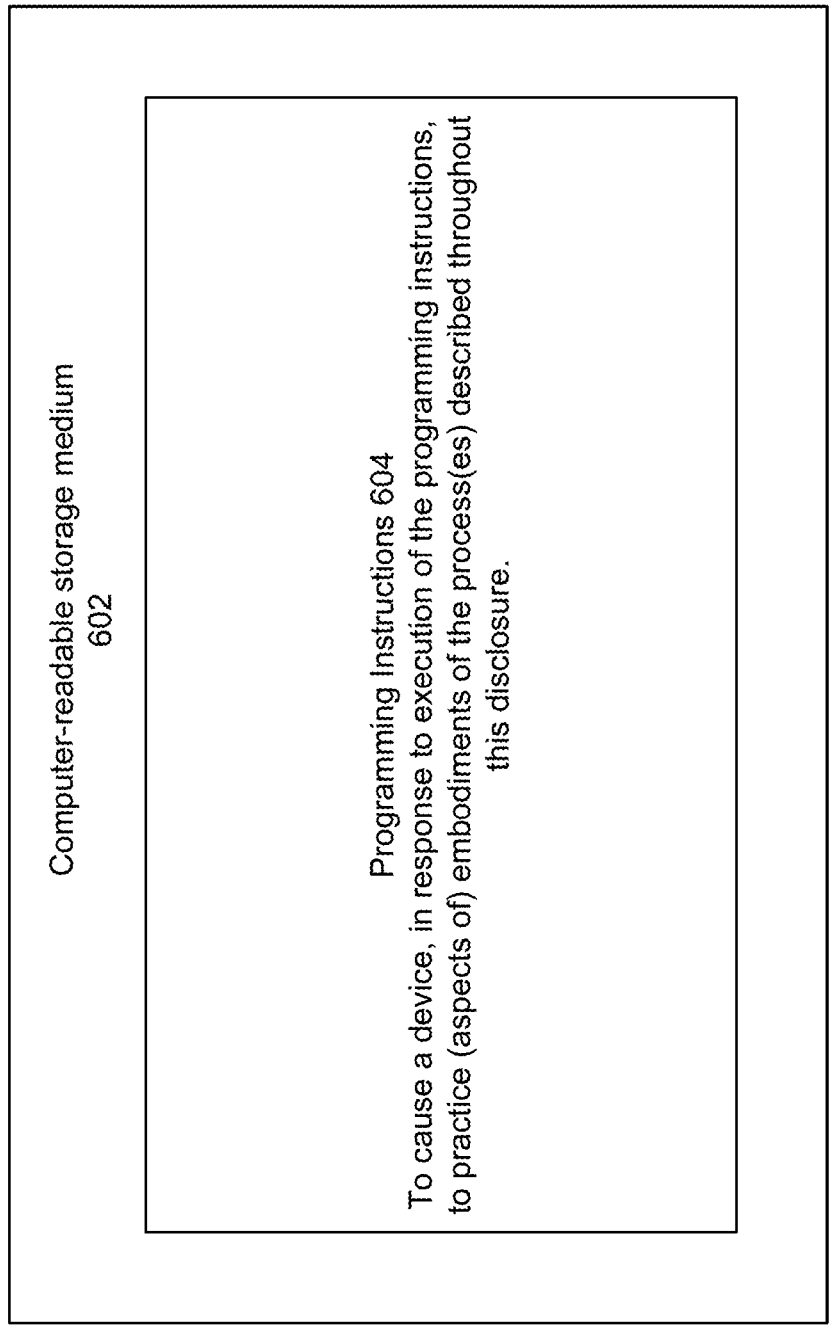
FIG. 6 is a block diagram of a computer-readable storage medium that can be used to implement some of the components of the system of FIG. 1.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) sensor management apparatus 102, including sensor analyzer 150 and/or sensor manager 152. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

EXAMPLES

The following examples pertain to further embodiments.

Example 1 is an apparatus for managing a sensor in a computer-assisted or autonomous driving (CA/AD) vehicle, comprising a sensor analyzer to determine a difference between a baseline reading and a subsequent reading of a landmark by the sensor, the baseline reading having been recorded at a first point in time when the sensor first detects the landmark; and the subsequent reading having been recorded at a second subsequent point in time when the sensor again detects the landmark; and a sensor manager coupled to the sensor reading analyzer to determine whether a management action is needed for the sensor based at least in part on the determined difference between the baseline and subsequent readings experienced for a time period length defined by the first and second points of time, in view of other differential experiences for other time period lengths reported by other similar sensors on other CA/AD vehicles.

Example 2 includes the subject matter of example 1, and may further include wherein the sensor analyzer is to further record the CA/AD vehicle's physical location when the sensor first detects the landmark; and detect the vehicle's subsequent return to substantially the same physical location as the physical location recorded when the landmark was first detected.

Example 3 includes the subject matter of example 2, and may further include wherein the sensor manager is to further select the landmark based upon a usage characteristic of the sensor.

Example 4 includes the subject matter of example 1, and may further include wherein the landmark is a first landmark, and the sensor analyzer and the sensor manager are to perform the determinations for a plurality of landmarks that includes the first landmark.

Example 5 includes the subject matter of any of example 1-4, and may further include wherein the sensor manager is to determine whether the management action is needed in further view of environmental conditions at the time of the second reading.

Example 6 includes the subject matter of example 5, and may further include wherein the differential experiences further include environmental conditions experienced by the other CA/AD vehicles.

Example 7 includes the subject matter of example 5, and may further include wherein the environmental conditions may include weather, traffic, dirt or debris on the vehicle.

Example 8 includes the subject matter of example 1, and may further include wherein the apparatus is a CA/AD management system disposed within the vehicle, and further comprises an interface in communication with the sensor to receive the sensor readings; and a network interface to communicate with a remote server to receive the other differential experiences.

Example 9 includes the subject matter of example 8, and may further include wherein the network interface is further to transmit the baseline reading, the subsequent reading, the difference between the baseline and subsequent readings, or a need for the determined management action.

Example 10 includes the subject matter of example 8 or 9, and may further include wherein the network interface comprises a wireless transceiver.

Example 11 includes the subject matter of example 8 or 9, and may further include wherein the sensor is to run a self-test, and the sensor manager is to determine whether the management action is needed in further view of the results of the self-test.

Example 12 includes the subject matter of example 8 or 9, and may further include wherein the sensor comprises a plurality of sensors, and at least two of the plurality of sensors are of different types.

Example 13 includes the subject matter of example 1, and may further include wherein the apparatus is the CA/AD vehicle, and further comprises a sensor in communication with the sensor analyzer.

Example 14 is a method for managing a sensor in a computer-assisted or autonomous driving (CA/AD) vehicle, comprising recording a baseline reading of a landmark of the sensor of the CA/AD vehicle at a first point in time when the sensor first detects the landmark; recording a subsequent reading of the landmark of the same sensor at a second subsequent point in time when the sensor again detects the landmark; and determining whether a management action is needed for the sensor based at least in part on a difference between the baseline and subsequent readings experienced for a time period length defined by the first and second points of time, in view of other differential experiences for other time period lengths reported by other similar sensors on other CA/AD vehicles.

Example 15 includes the subject matter of example 14, and may further include determining the difference between the baseline reading and the subsequent reading.

Example 16 includes the subject matter of example 14, and may further include recording the CA/AD vehicle's physical location when the sensor first detects the landmark; and detecting the vehicle's subsequent return to substantially the same physical location as the physical location recorded when the landmark was first detected.

Example 17 includes the subject matter of example 14, and may further include selecting the landmark based upon a usage characteristic of the sensor.

Example 18 includes the subject matter of example 14, and may further include wherein the landmark is a first landmark, and determining whether a management action is needed is based upon baseline and subsequent readings for a plurality of landmarks that includes the first landmark.

Example 19 includes the subject matter of any of examples 14-18, and may further include wherein determining whether the management action is needed is in further view of environmental conditions at the time of the second reading.

Example 20 includes the subject matter of example 19, and may further include wherein the differential experiences further include environmental conditions experienced by the other CA/AD vehicles.

Example 21 includes the subject matter of example 19, and may further include wherein the environmental conditions may include weather, traffic, dirt or debris on the vehicle.

Example 22 includes the subject matter of example 14, and may further include wherein the method is performed by a CA/AD management system disposed within the vehicle, and further comprises interfacing with the sensor to receive the sensor readings; and communicating via a network interface with a remote server to receive the other differential experiences.

Example 23 includes the subject matter of example 22, and may further include wherein communicating further comprises transmitting the baseline reading, the subsequent reading, the difference between the baseline and subsequent readings, or a need for the determined management action.

Example 24 includes the subject matter of example 22 or 23, and may further include wherein the network interface comprises a wireless transceiver.

Example 25 includes the subject matter of example 22 or 23, and may further include wherein the sensor is to run a self-test, and the method further comprises determining whether the management action is needed in further view of the results of the self-test.

Example 26 includes the subject matter of example 22 or 23, and may further include wherein the sensor comprises a plurality of sensors, and at least two of the plurality of sensors are of different types.

Example 27 includes the subject matter of example 14, and may further include wherein the method is performed by the CA/AD vehicle.

Example 28 is a non-transitory computer-readable medium (CRM) comprising instructions to cause a sensor management apparatus for a computer-assisted or autonomous driving (CA/AD) vehicle, in response to execution of the instructions by a processor, to record a baseline reading of a landmark of a sensor of the CA/AD vehicle at a first point in time when the sensor first detects the landmark; record a subsequent reading of the landmark of the same sensor at a second subsequent point in time when the CA/AD vehicle again detects the landmark; and determine whether a management action is needed for the sensor based at least in part on a difference between the baseline and subsequent readings experienced for a time period length defined by the first and second points of time, in view of other differential experiences for other time period lengths reported by other similar sensors on other CA/AD vehicles.

Example 29 includes the subject matter of example 28, and may further include wherein the instructions are further to determine the difference between the baseline reading and the subsequent reading.

Example 30 includes the subject matter of example 28, and may further include wherein the instructions are further to record the CA/AD vehicle's physical location when the sensor first detects the landmark; and detect the vehicle's subsequent return to substantially the same physical location as the physical location recorded when the landmark was first detected.

Example 31 includes the subject matter of example 28, and may further include wherein the instructions are further to select the landmark based upon a usage characteristic of the sensor.

Example 32 includes the subject matter of example 28, and may further include wherein the landmark is a first landmark, and the instructions are further to perform the determinations for a plurality of landmarks that includes the first landmark.

Example 33 includes the subject matter of any of examples 28-32, and may further include wherein the instructions are further to determine whether the management action is needed in further view of environmental conditions at the time of the second reading.

Example 34 includes the subject matter of example 33, and may further include wherein the differential experiences further include environmental conditions experienced by the other CA/AD vehicles.

Example 35 includes the subject matter of example 33, and may further include wherein the environmental conditions may include weather, traffic, dirt or debris on the vehicle.

Example 36 includes the subject matter of example 28, and may further include wherein the sensor management apparatus is part of a CA/AD management system for the vehicle.

Example 37 includes the subject matter of example 36, and may further include wherein the instructions are further to cause the baseline reading, the subsequent reading, the difference between the baseline and subsequent readings, or a need for the determined management action to be transmitted to a remote server.

Example 38 includes the subject matter of example 37, and may further include wherein the baseline reading, the subsequent reading, the difference between the baseline and subsequent readings, or a need for the determined management action are to be transmitted to the remote server by a wireless transceiver.

Example 39 includes the subject matter of example 28, and may further include wherein the sensor management apparatus is part of the CA/AD vehicle, and further comprises a sensor in communication with the sensor management apparatus.

Example 40 includes the subject matter of example 39, and may further include wherein the sensor is to run a self-test, and the instructions are further to determine whether the management action is needed in further view of the results of the self-test.

Example 41 includes the subject matter of example 39 or 40, and may further include wherein the sensor comprises a plurality of sensors, and at least two of the plurality of sensors are of different types.

Example 42 is a manager for a sensor in a computer-assisted or autonomous driving (CA/AD) vehicle, comprising means for recording a baseline reading of a landmark from the sensor of the CA/AD vehicle at a first point in time when the sensor first detects the landmark, and a subsequent reading of the landmark from the same sensor at a second subsequent point in time when the sensor again detects the landmark; and means for determining whether a management action is needed for the sensor based at least in part on a difference between the baseline and subsequent readings experienced for a time period length defined by the first and second points of time, in view of other differential experiences for other time period lengths reported by other similar sensors on other CA/AD vehicles.

Example 43 includes the subject matter of example 42, and may further include wherein the means for recording is to further record the CA/AD vehicle's physical location when the sensor first detects the landmark; and detect the vehicle's subsequent return to substantially the same physical location as the physical location recorded when the landmark was first detected.

Example 44 includes the subject matter of example 43, and may further include wherein the means for recording is to further select the landmark based upon a usage characteristic of the sensor.

Example 45 includes the subject matter of example 42, and may further include wherein the landmark is a first landmark, and the means for determining is to perform the determinations for a plurality of landmarks that includes the first landmark.

Example 46 includes the subject matter of any of examples 42-45, and may further include wherein the means for determining is to determine whether the management action is needed in further view of environmental conditions at the time of the second reading.

Example 47 includes the subject matter of example 46, and may further include wherein the differential experiences further include environmental conditions experienced by the other CA/AD vehicles.

Example 48 includes the subject matter of example 46, and may further include wherein the environmental conditions may include weather, traffic, dirt or debris on the vehicle.

Example 49 includes the subject matter of example 42, and may further include wherein the manager is a CA/AD management system for the vehicle, and further comprises communication means in communication with the sensor to receive the sensor readings; and network means to communicate with a remote server to receive the other differential experiences.

Example 50 includes the subject matter of example 49, and may further include wherein the network means is further to transmit the baseline reading, the subsequent reading, the difference between the baseline and subsequent readings, or a need for the determined management action.

Example 51 includes the subject matter of example 49 or 50, and may further include wherein the network means comprises a wireless transceiver.

Example 52 includes the subject matter of example 49 or 50, and may further include wherein the sensor is to run a self-test, and the determining means is to determine whether the management action is needed in further view of the results of the self-test.

Example 53 includes the subject matter of example 49 or 50, and may further include wherein the sensor comprises a plurality of sensors, and at least two of the plurality of sensors are of different types.

Example 54 includes the subject matter of example 42, and may further include wherein the manager is the CA/AD vehicle, and further comprises a sensor.

What is claimed is:

1. An apparatus for managing a sensor in a computer-assisted or autonomous driving (CA/AD) vehicle, comprising:
   a sensor analyzer to determine a difference between a baseline reading and a subsequent reading of a landmark by the sensor, the baseline reading having been recorded at a first point in time when the sensor first detects the landmark; and the subsequent reading having been recorded at a second subsequent point in time when the sensor again detects the landmark; and
   a sensor manager coupled to the sensor analyzer to determine whether a management action is needed for the sensor based at least in part on the determined difference between the baseline and subsequent readings experienced for a time period length defined by the first and second points of time, in view of other differential experiences for other time period lengths reported by other similar sensors on other CA/AD vehicles,
   wherein, when it is determined that a management action is needed, the sensor manager is to either execute the management action or notify a user to take the management action.

2. The apparatus of claim 1, wherein the sensor analyzer is to further:
   record the CA/AD vehicle's physical location when the sensor first detects the landmark; and
   detect the vehicle's subsequent return to substantially the same physical location as the physical location recorded when the landmark was first detected.

3. The apparatus of claim 2, wherein the sensor manager is to further select the landmark based upon a usage characteristic of the sensor.

4. The apparatus of claim 1, wherein the landmark is a first landmark, and the sensor analyzer and the sensor manager are to perform the determinations for a plurality of landmarks that includes the first landmark.

5. The apparatus of claim 1, wherein the sensor manager is to determine whether the management action is needed in further view of environmental conditions at the time of the second reading.

6. The apparatus of claim 5, wherein the differential experiences further include environmental conditions experienced by the other CA/AD vehicles.

7. The apparatus of claim 5, wherein the environmental conditions may include weather, traffic, dirt or debris on the vehicle.

8. The apparatus of claim 1, wherein the apparatus is a CA/AD management system disposed within the vehicle, and further comprises:
an interface in communication with the sensor to receive the sensor readings; and
a network interface to communicate with a remote server to receive the other differential experiences.

9. The apparatus of claim 8, wherein the network interface is further to transmit the baseline reading, the subsequent reading, the difference between the baseline and subsequent readings, or a need for the determined management action.

10. The apparatus of claim 8, wherein the network interface comprises a wireless transceiver.

11. The apparatus of claim 1, wherein the apparatus is the CA/AD vehicle, and further comprises a sensor in communication with the sensor analyzer.

12. The apparatus of claim 9, wherein the sensor is to run a self-test, and the sensor manager is to determine whether the management action is needed in further view of results of the self-test.

13. The apparatus of claim 9, wherein the sensor comprises a plurality of sensors, and at least two of the plurality of sensors are of different types.

14. A method for managing a sensor in a computer-assisted or autonomous driving (CA/AD) vehicle, comprising:
recording a baseline reading of a landmark of the sensor of the CA/AD vehicle at a first point in time when the sensor first detects the landmark;
recording a subsequent reading of the landmark of the same sensor at a second subsequent point in time when the sensor again detects the landmark;
determining whether a management action is needed for the sensor based at least in part on a difference between the baseline and subsequent readings experienced for a time period length defined by the first and second points of time, in view of other differential experiences for other time period lengths reported by other similar sensors on other CA/AD vehicles; and
when it is determined that a management action is needed, either executing the management action or notifying a user to take the management action.

15. The method of claim 14, further comprising determining the difference between the baseline reading and the subsequent reading.

16. The method of claim 14, further comprising:
recording the CA/AD vehicle's physical location when the sensor first detects the landmark; and
detecting the vehicle's subsequent return to substantially the same physical location as the physical location recorded when the landmark was first detected.

17. The method of claim 14, wherein the method is performed by a CA/AD management system disposed within the vehicle, and further comprises:
interfacing with the sensor to receive the sensor readings; and
communicating via a network interface with a remote server to receive the other differential experiences.

18. A non-transitory computer-readable medium (CRM) comprising instructions to cause a sensor management apparatus for a computer-assisted or autonomous driving (CA/AD) vehicle, in response to execution of the instructions by a processor, to:
record a baseline reading of a landmark of a sensor of the CA/AD vehicle at a first point in time when the sensor first detects the landmark;
record a subsequent reading of the landmark of the same sensor at a second subsequent point in time when the CA/AD vehicle again detects the landmark;
determine whether a management action is needed for the sensor based at least in part on a difference between the baseline and subsequent readings experienced for a time period length defined by the first and second points of time, in view of other differential experiences for other time period lengths reported by other similar sensors on other CA/AD vehicles; and
when it is determined that a management action is needed, either execute the management action or notify a user to take the management action.

19. The CRM of claim 18, wherein the instructions are further to determine the difference between the baseline reading and the subsequent reading.

20. The CRM of claim 18, wherein the instructions are further to:
record the CA/AD vehicle's physical location when the sensor first detects the landmark; and
detect the vehicle's subsequent return to substantially the same physical location as the physical location recorded when the landmark was first detected.

21. The CRM of claim 18, wherein the instructions are further to select the landmark based upon a usage characteristic of the sensor.

22. A manager for a sensor in a computer-assisted or autonomous driving (CA/AD) vehicle, comprising:
means for recording a baseline reading of a landmark from the sensor of the CA/AD vehicle at a first point in time when the sensor first detects the landmark, and a subsequent reading of the landmark from the same sensor at a second subsequent point in time when the sensor again detects the landmark; and
means for determining whether a management action is needed for the sensor based at least in part on a difference between the baseline and subsequent readings experienced for a time period length defined by the first and second points of time, in view of other differential experiences for other time period lengths reported by other similar sensors on other CA/AD vehicles;
wherein, when it is determined that a management action is needed, the means for determining is to either execute the management action or notify a user to take the management action.

23. The manager of claim 22, wherein the means for recording is to further:

record the CA/AD vehicle's physical location when the sensor first detects the landmark; and detect the vehicle's subsequent return to substantially the same physical location as the physical location recorded when the landmark was first detected.

24. The manager of claim 22, wherein the means for determining is to determine whether the management action is needed in further view of environmental conditions at the time of the second reading.

25. The manager of claim 22, wherein the manager is a CA/AD management system for the vehicle, and further comprises:

communication means in communication with the sensor to receive the sensor readings; and network means to communicate with a remote server to receive the other differential experiences.

* * * * *